UNITED STATES PATENT OFFICE.

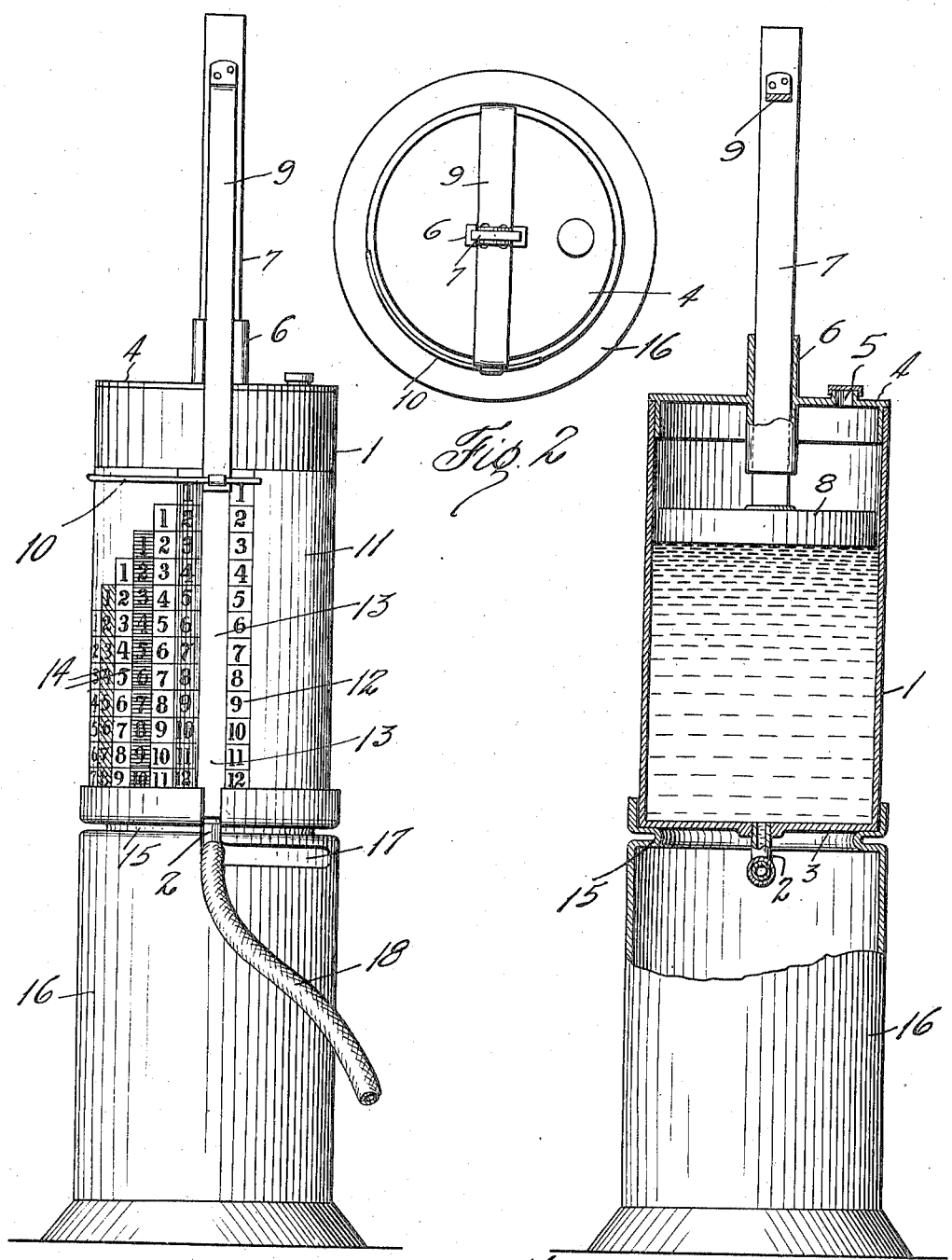

COLLUMBUS S. MAULDIN, OF SULPHUR SPRINGS, TEXAS.

MEASURING-DISPENSER.

1,290,274.                Specification of Letters Patent.      Patented Jan. 7, 1919.

Application filed April 8, 1918. Serial No. 227,205.

*To all whom it may concern:*

Be it known that I, COLLUMBUS S. MAULDIN, a citizen of the United States, residing at Sulphur Springs, in the county of Hopkins and State of Texas, have invented certain new and useful Improvements in Measuring-Dispensers, of which the following is a specification.

This invention relates to new and useful improvements in measuring dispensers.

The purpose of the invention is to provide a dispensing receptacle with a gage and a visible measuring scale with which the gage coöperates so that the exact quantity of fluid dispensed from the receptacle may be observed at a glance; and further to arrange the scale with units of measurement disposed in columns in stepped order whereby after each operation or dispensation not only the exact quantity is indicated but the gage will be at the top of a column bearing the smallest unit of measurement so as to indicate the exact amount of the next dispensation, and at the same time show the exact quantity remaining in the receptacle.

In carrying out the invention a receptacle is provided with a discharge outlet and a float carrying a support for a gage or indicator. On the outside of the receptacle columns of figures are arranged in the path of the gage, each column having its upper end terminating in stepped order to the preceding column and also having the same unit of measurement at its upper end after a quantity of fluid has been removed from the receptacle the float will be lowered and the gage will stand at the head of one of the columns, and the next quantity dispensed will be measured starting from the unit of lowest value, and this column will also show the quantity remaining in the receptacle. In fact, the figure at the bottom of each column shows the quantity of fluid remaining in the receptacle when the gage reaches the top of said column. The receptacle is mounted on a suitable support and may be rotated to bring the columns into view of the customer.

The invention will be more readily understood from a reading of the following specification and by reference to the accompanying drawings, in which an example of the invention is illustrated, and wherein—

Figure 1 is an elevation of an apparatus constructed in accordance with this invention, Fig. 2 is a plan view of the same, and Fig. 3 is a view showing the receptacle in section and the supporting base partly in section and partly in elevation.

In the drawings the numeral 1 designates a cylindrical receptacle having an outlet elbow 2 in its bottom 3. The receptacle is provided with a cap 4 at its upper end and may be filled through an opening 5 or in any other manner. The receptacle is designed for containing liquids and must be constructed accordingly.

The cap supports a sleeve 6 intermediate the ends of the latter so that said sleeve projects above and below the cap and is disposed at the center thereof. The sleeve is rectangular in cross section and receives a flat carrier-system 7 which is slidable vertically through the sleeve. On its lower end within the receptacle the stem carries a disk float 8 which rests on top of the liquid within said receptacle. Angular arms 9 are attached to the upper extremity of the stem 7 and overhang the sides of the receptacle. One of these arms carries an arcuate horizontal indicator or gage 10 which is suitably fastened thereon and projects on each side thereof. The receptacle has a panel 11 covering the greater portion of its height and terminating short of the top. This panel is provided with vertical columns 12, 13 and 14 respectively. The column 13 is disposed between the column 12 and the columns 14 and in the path of the gage arm 9. The column 13 is blank and provides a space for the arm which it is understood descends when the float 8 is lowered by removing the liquid from the receptacle. The column 12 is subdivided into measuring spaces each of which is provided with a numeral and these spaces are proportioned so that when the quantity indicated by the numeral has been drawn off from the receptacle the gage 10 will be lowered the distance of said space. For instance, in disposing fuel oil such as gasolene the numerals will indicate gallons and as shown in Fig. 1 these numerals run from 1 to 12 showing that the receptacle holds 12 gallons and as each gallon is removed the gage 10 will be lowered the distance of one space.

It is to be understood that the capacity of the receptacle may vary and that the numeral spaces might be subdivided so that the measurement may be as desired.

The column 14 alongside of the column 13 is a duplicate of the column 12, the spaces and marks therebetween being alined. However, each succeeding column 14 is one space shorter than its predecessor and bears the numeral 1 in its uppermost space. The columns 14 are thus stepped and each is one unit shorter than the other. The numeral at the bottom of each column 14 indicates the number of gallons remaining in the receptacle when the gage 10 reaches the top of the column. It will be seen that with the receptacle filled to its capacity, as shown in the drawings, the gage 10 will stand at the top of the column 12 and the next adjacent column 14. Should three gallons be removed from the receptacle the float 8 will be lowered until the gage 10 stands on the line between the numerals 3 and 4 in the column 12 and the next adjacent column 14 as is evident from Fig. 1; however the gage 10 will also be at the top of the fourth column 14 to the left which shows that nine gallons remain in the receptacle and the next measurement will be started with one gallon or fraction thereof. It is obvious that after each discharge of fluid from the receptacle the gage 10 will stand at the top of the column at the zero point so that the exact quantity next discharged is shown in plain figures.

The receptacle is supported on an internal annular bead 15 in the upper portion of a base or pedestal 16 as shown in Fig. 3. The customer can see at a glance just what quantity he is receiving. If desired the pedestal 16 may be provided with a slot 17 receiving a discharge hose 18 which extends from the elbow 2. This permits the receptacle to be rotated on the bead 15 so as to bring the columns 14 farthest removed from the column 13 in the view of the customer as will be evident. It is clear that the columns 14 could be painted in different colors or provided with figures of different colors or otherwise contrasted if desired and various other changes made.

The foregoing description and illustration clearly express the invention, but it is to be understood that said illustration is merely an exemplification and the invention may be carried out in various other ways.

What I claim; is,

1. In a measuring dispenser, a receptacle, a float mounted in the receptacle, a guide sleeve carried in the top of the receptacle, a carrier-stem slidable vertically through the sleeve and mounted on the float, said stem projecting above the top of the receptacle, a gage arm depending from the stem over the side of the receptable, there being measuring columns in stepped order on the side of the receptacle, a gage carried by the arm arranged to register successively with the top of each stepped column as the float is lowered in the receptacle.

2. In a measuring dispenser, a receptacle, a float mounted in the receptacle, a guide sleeve in the top of the receptacle, a carrier-stem slidable vertically through the sleeve and mounted on the float, said stem projecting above the top of the receptacle, a gage arm depending from the stem over the side of the receptacle, there being measuring columns in stepped order on the side of the receptacle, a gage carried by the arm arranged to register successively with the top of each stepped column as the float is lowered in the receptacle, and a pedestal support rotatably supporting the receptacle.

3. In a measuring dispenser, a receptacle, a float arranged within the receptacle and a gage carried by the float and positioned exteriorly of the receptacle in juxtaposition to its wall so as to move vertically of the same when the float is raised and lowered, there being a measuring panel on the exterior of the receptacle having individual vertical columns containing measuring units in the path of the gage, the columns terminating at their upper ends in stepped order and each beginning with the lowest unit of measurement, and each of said columns having at its lower end a unit of measurement indicating the quantity contained in the receptacle when the gage reaches the top of the said column.

In testimony whereof I affix my signature.

COLLUMBUS S. MAULDIN.